United States Patent
Rothschild

(10) Patent No.: US 10,108,836 B2
(45) Date of Patent: Oct. 23, 2018

(54) SYSTEM AND METHOD OF PROVIDING PRODUCT INFORMATION USING PRODUCT IMAGES

(76) Inventor: Leigh M. Rothschild, Sunny Isles Beach, FL (US)

(*) Notice: Subject to any disclaimer, the term of this patent is extended or adjusted under 35 U.S.C. 154(b) by 927 days.

(21) Appl. No.: 12/950,657

(22) Filed: Nov. 19, 2010

(65) Prior Publication Data
US 2012/0128240 A1     May 24, 2012

(51) Int. Cl.
*G06K 9/00* (2006.01)
*G06K 9/46* (2006.01)

(52) U.S. Cl.
CPC .............. *G06K 9/00* (2013.01); *G06K 9/46* (2013.01); *G06K 2209/25* (2013.01)

(58) Field of Classification Search
None
See application file for complete search history.

(56) References Cited

U.S. PATENT DOCUMENTS

| 4,817,166 | A  | * | 3/1989  | Gonzalez ............. G06K 9/3258 |
|           |    |   |         | 382/105                           |
| 2003/0091237 | A1 | * | 5/2003 | Cohen-Solal et al. ........ 382/204 |
| 2007/0143256 | A1 | * | 6/2007 | Starr ................................ 707/3 |
| 2008/0279481 | A1 | * | 11/2008 | Ando .......................... 382/306 |
| 2010/0009713 | A1 | * | 1/2010  | Freer .......................... 455/556.1 |
| 2010/0092093 | A1 | * | 4/2010  | Akatsuka et al. ............ 382/203 |
| 2011/0191150 | A1 | * | 8/2011  | Blackhurst ........... G06Q 20/322 |
|              |    |   |         | 705/14.1 |
| 2012/0113141 | A1 | * | 5/2012  | Zimmerman ...... G06Q 30/0643 |
|              |    |   |         | 345/633 |

* cited by examiner

*Primary Examiner* — Ryan P Potts
(74) *Attorney, Agent, or Firm* — Eugenio J. Torres-Oyola; Victor M. Rodriguez-Reyes; Rafael Rodriguez-Muriel

(57) ABSTRACT

A method and system for determining product information from a logo. In one embodiment, an image of a logo may be captured by a portable image capture device. The captured image may be analyzed to recognize the logo. The product may then be identified based on the recognized logo.

17 Claims, 3 Drawing Sheets

SYSTEM AND METHOD OF PROVIDING PRODUCT INFORMATION USING PRODUCT IMAGES

CROSS-REFERENCE TO RELATED APPLICATION n/a.

STATEMENT REGARDING FEDERALLY SPONSORED RESEARCH OR DEVELOPMENT n/a

FIELD OF THE INVENTION

The present invention relates to product identification and more particularly to a method and system for product identification based on a logo.

BACKGROUND OF THE INVENTION

Consumers shopping for products are faced with many choices. Often, the consumer desires more information about a product than is provided by the product itself or its packaging or labels. For example, a consumer may wish to know the size of the product, its unit price, the ingredients of the product, instructions for use, safety information, assembly instructions, and instructions for use, to name just a few items of information about a product.

Currently, many products have bar codes that may be read by a bar code reader. The image of a bar code may be used to identify a product associated with the bar code and to retrieve information about the product. Not all consumers have a bar code reader or the software required to associate a bar code with product information. However, cell phones and other mobile devices that have image capturing capabilities are in the hands of many consumers. What is needed is a way to use the image capture capabilities of such devices to capture a product logo, identify the logo and retrieve product information based on the identification of the logo.

SUMMARY OF THE INVENTION

The present invention advantageously provides a method and system for determining product information from a logo. According to one aspect, the invention provides a method that includes receiving an image of the logo. The method includes analyzing the image to recognize the logo. The product is identified based on the recognized logo. Information and recommendations corresponding to the identified product are provided.

According to another aspect, the invention provides a system for identifying a product. The system includes a receiver to receive an image of a logo. The system also includes an image analyzer to analyze the image to recognize the logo. The system also includes a product identifier to identify the product based on the recognized logo.

According to yet another aspect, the invention provides an apparatus to obtain product information based on a logo. The apparatus includes a memory and a processor coupled to the memory. The memory stores images of logos corresponding to products. The processor compares a received image of a logo to the stored images of logos to identify the received logo. A product is identified based on the identification of the received logo. Information corresponding to the identified product is transmitted to a user device.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
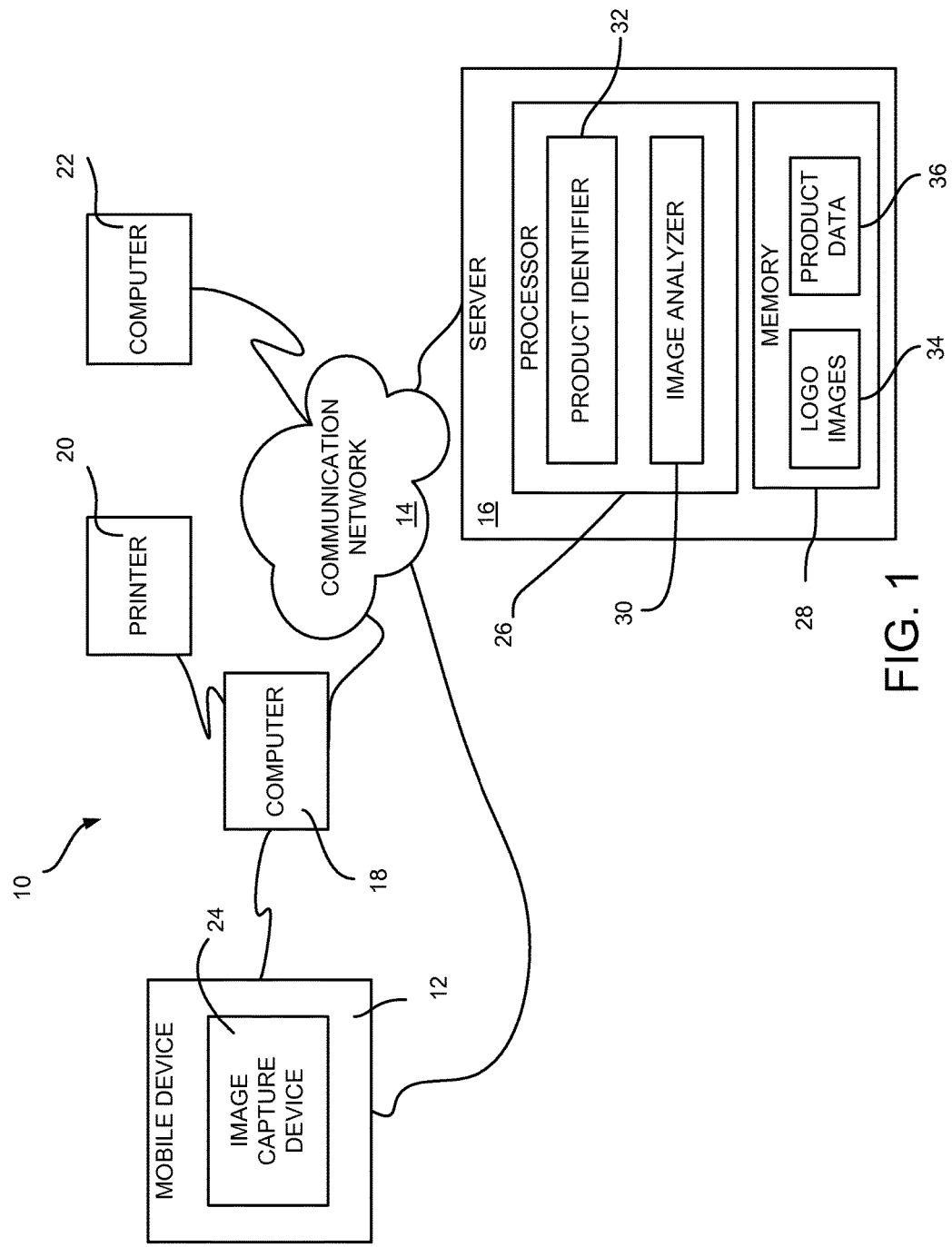
FIG. 1 is a diagram of an exemplary product information system constructed in accordance with the principles of the present invention.

Before describing in detail exemplary embodiments that are in accordance with the present invention, it is noted that the embodiments reside primarily in combinations of apparatus components and processing steps related to implementing a system and method for acquiring and communicating location-specific information. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. Also, as used herein, the term "logo" is not limited solely to trademark images. Rather, the term "logo" includes trademark images as well as other product images that can be used to identify a product.

Referring now to the drawing figures in which like reference designators refer to like elements, there is shown in FIG. 1 a block diagram of an exemplary product information system constructed in accordance with principles of the present invention, and generally designated as "10". The system 10 is a network for providing information concerning a product identified based on a logo on the product. System 10 includes a mobile device 12 in communication with a communications network 14 which is in communication with a server 16. The mobile device 12 may be a cellular telephone, a cordless telephone, a personal digital assistant, a camera, a laptop or other portable device capable of capturing an image via an image capture device 24 within the mobile device 12. The mobile device 12 may be communicatively coupled to the communication network 16, wirelessly or by wire or optical fiber. The mobile device 12 may also be communicatively coupled to a computer 18 such as a home computer of the owner of the mobile device 12. The computer 18 may be communicatively coupled to the communication network 14. A printer 20 may also be coupled to the computer 18. Other computers 22 may also be in communication with the network 14.

The server 16 includes a processor 26 and a memory 28. The processor 26 executes computer code to perform functions of an image analyzer 30 and a product identifier 32. The memory 28 stores a database of logo images 34 and product data 36 of products sold under corresponding logos. In operation, the server 16 receives an image of a logo captured by the image capture device 24, which captures the image of the logo that is impressed, sewn, stamped, or otherwise placed on a product. The received image of the logo is analyzed by the image analyzer 30 to identify the logo. The analyzed image of the logo may be compared to analyzed logo images stored in the logo image store 34. When a logo is recognized, a product corresponding to the logo is identified, and product data 36 of the product may be retrieved. This data may be transmitted to the mobile device 12 that captured the logo image and/or the computer 18.

The product data may include a size, material, flavor, color, wash instructions, use instructions, safety information, weight, volume, price, ingredients, parts list, assembly instructions, disposal instructions, manufacturer identity, date of manufacture, expiration date, place of manufacture, and/or a Stock Keeping Unit (SKU) of the product. The product data may also include recommendations of other products that are complementary or relevant to the identified product. A complementary product may be a product that is used in conjunction with the selected product. For example, drill bits would be a complementary product to an electric drill. Fabric softener would be complementary to laundry soap. In some embodiments, the user may be provided a hyperlink to a website having information about the product and/or related products.

For example, a user may be in a retail store and wish to obtain information concerning a particular product, for example, a shirt. The shirt has a logo placed on it by the manufacturer, for example, Ralph Lauren. The user may capture an image of the logo using a mobile device 12, such as a mobile phone that has a built in camera. The mobile device 12 transmits the captured image to the server 16 via the communication network 14. The mobile device 12 may transmit the image wirelessly using a wireless technology such as cellular, WiFi, WiMax, Bluetooth, wireless LAN, OFDM, CDMA, satellite communications, infrared communications, or other technology. Alternatively, the mobile device may by coupled to the communication network 14 via a wire line connection such as Universal Serial Bus (USB), cable, twisted pair, or optical fiber. The communication network 14 may be a Local Area Network (LAN), a wide area network, such as the Internet, and may include the Public Switched Telephone Network, Optical Transport Network, Ethernet, etc.

When the captured image of the shirt is received at the server 16, an image recognition engine or image analyzer 30 processes the image. The image recognition engine 30 may include gradient operators and other components known in the art of image recognition. For example, the image recognition engine may Fourier transform the image and identify a logo based on the spatial frequency content of the image.

The analyzed image may be compared to a plurality of logo images 34 stored in the memory 28, to determine a match between the analyzed image and a stored image. When a match is obtained, a product associated with the logo image is identified by the product identifier 32. In some embodiments, the image is analyzed to determine the presence or absence of distinctive features of a logo in the image. A first product or first set of products may be associated with a first set of distinctive features of the logo, and a second product or second set of products may be associated with a second set of distinctive features of the logo.

Product data 36 associated with the product may then be retrieved and transmitted to the mobile device 12. The product data may then be displayed to the user via a display of the mobile device 12. The product data may, at the request of the user of the mobile device 12, be sent to a user's home or office computer 18, so that a large volume of product data may be retrieved without using the limited memory capacity of the mobile device 12.

In addition to recognizing the logo, the color of the logo and/or a color of a material that forms the background of the logo may also be determined by suitable color recognition software. Further, the size of the logo may be determined by software algorithms that can determine the size of an object in an image. The processor 26 may therefore identify a product based on the identified logo, the color of the logo, the color of the background of the logo, and/or the size of the logo.

For example, the product type may be identified by the shape of the logo, whereas the size of the product may be identified based on the size of the logo. In some cases, products of different sizes may have the same logo of different sizes. For example, a small, medium, large, or extra large logo may symbolize a small, medium, large, or extra large shirt size, respectively. As another example, a Stock Keeping Unit (SKU) of the product may be identified by a combination of the color of the logo and a color of the background. Color identification software is known in the art and may represent colors numerically. Therefore, the combination of logo color 182 with background material color 105 may resolve to a SKU of 10708. A color system of 1000 colors would provide over a million SKUs.

Thus, one embodiment is a system to obtain product information based on a logo of the product. The system includes a receiver to receive an image of the logo. The image may include a color of the logo, and a background color. The system includes an image analyzer to analyze the image to identify the logo. A product identifier identifies the product based on the recognized logo. Information about the product may be based on a color of the logo, a background color, and a size of the logo.

Figure 2:
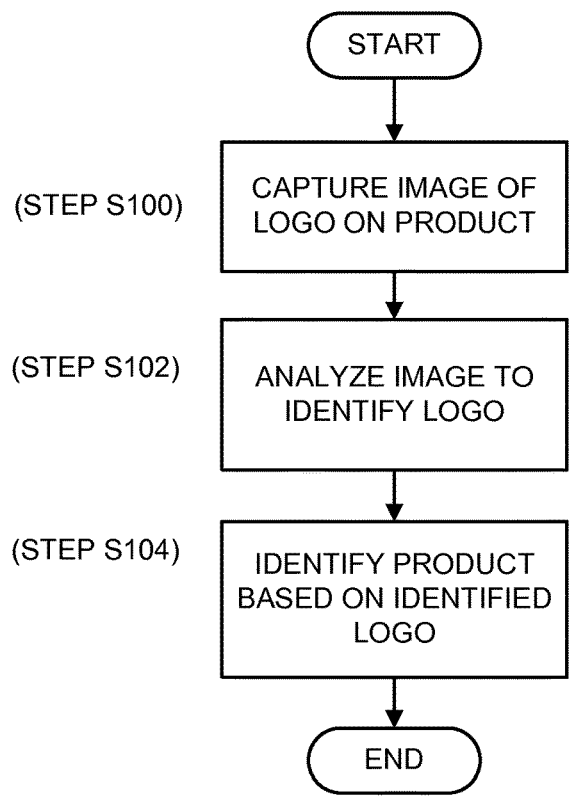
FIG. 2 is a flow chart of an exemplary process for product identification based on logo recognition.

FIG. 2 is a flow chart of an exemplary process for product identification based on logo recognition. An image of a logo on a product is captured (step S100). The captured logo image is analyzed to identify the logo (step S102). The product is identified based on the identified logo (step S104).

Figure 3:
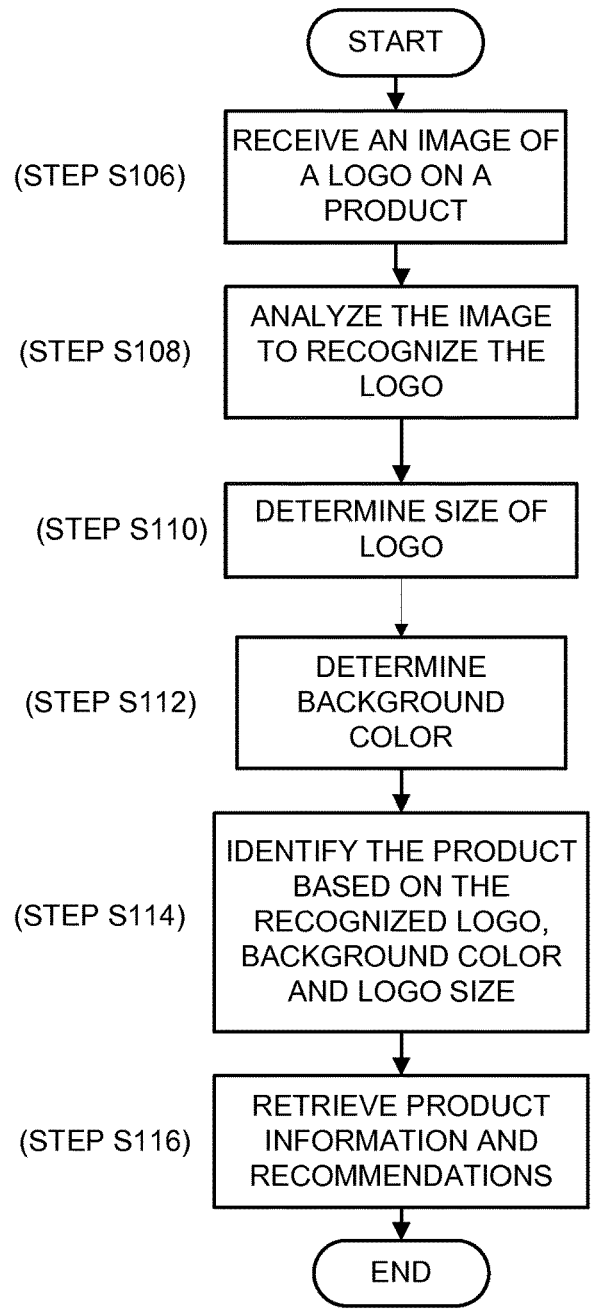
FIG. 3 is a flow chart of an exemplary process for product identification based on logo, background color and logo size.

FIG. 3 is a flow chart of an exemplary process for product identification based on logo, background color and logo size. An image of a logo on a product is received (step S106). The received image is analyzed to recognize the logo (step S108). The size of the logo is determined (S110). The background color is also determined (step S112). The product is identified based on the logo, background color and logo size (step S114). Information concerning the identified product is retrieved (step 116).

Thus, one embodiment is a method for determining product information based on an image of a logo on the product or on the product's package. The method includes analyzing the logo to recognize the logo. This may include comparing the logo to a database of logos. Alternatively, the logo is recognized by numerical processing of the digital image of the logo to analyze and detect distinctive features of the logo. The color of the logo and the color of the background of the logo may also be determined. The product may be identified based on the particular logo, the color of the logo, the color of the background of the logo and the size of the logo, or other distinctive features of the logo. For example, a first set of products may have a first set of distinctive features in a logo, and a second set of products may have a second set of distinctive features in the logo. In one embodiment, a product or group of products can be identified based on the presence or absence of distinctive features of the logo.

Another embodiment is a computer readable tangible medium having instructions that when executed by a computer cause the computer to perform operations including receiving an image of a logo on a product, analyzing the image to recognize the logo, and identifying the product based on the recognized logo.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of providing information relating to a product, the method comprising:
   storing and associating one or more features of a logo with one or more products and corresponding product information in a memory storage device using a product identifier by a computer server;
   receiving, by the computer server, a captured image of a logo on a product;
   analyzing, by the computer server, the image to recognize the one or more features of the logo, wherein analyzing the image to recognize the logo includes determining a presence or absence of distinctive features of the logo;
   identifying, by the computer server, the product identifier based on the recognized one or more features of the logo;
   retrieving information concerning the one or more products by the computer server wherein the product information includes product recommendations of one or more complementary products relating to the one or more products, wherein the one or more complementary products include products that are designed to be used in conjunction with the one or more products; and
   providing, by the computer server, product information corresponding to the product identifier.

2. The method of claim 1, wherein the image of the logo includes a background color of the logo and analyzing the image to recognize the logo includes determining the background color.

3. The method of claim 2, wherein identifying the product identifier is based in part on the determined background color.

4. The method of claim 1, wherein analyzing the image includes determining a size of the logo.

5. The method of claim 4, wherein the size of the logo indicates a size of the one or more products.

6. The method of claim 1, further comprising determining a Stock Keeping Unit (SKU) of the one or more products by the computer server.

7. The method of claim 1, wherein the product information includes a price and at least one of a size, material, flavor, color, wash instructions, use instructions, safety information, weight, volume, ingredients, parts list, assembly instructions, disposal instructions, date of manufacture, expiration date, place of manufacture, manufacturer identity, and a hyperlink to a web site related to the product.

8. A system for identifying a product, the system comprising:
   a memory storage device;
   a processor coupled to the memory storage device, the processor configured to store and associate one or more features of a logo with one or more products and corresponding product information in the memory storage device using a product identifier;
   a receiver, the receiver receiving a captured image of a logo on a product;
   an image analyzer, the image analyzer analyzing the image to recognize the one or more features of the logo, wherein analyzing the image to recognize the logo includes determining a presence or absence of distinctive features of the logo; and
   the processor further configured to:
      identify the product identifier based on the recognized one or more features of the logo;
      retrieve information concerning the one or more products wherein the product information includes product recommendations of one or more complementary products relating to the one or more products, wherein the one or more complementary products include products that are designed to be used in conjunction with the one or more products; and
      provide product information corresponding to the product identifier.

9. The system of claim 8, wherein the image is received from a portable image capture device.

10. The system of claim 8, wherein analyzing the image to recognize the logo includes determining a color and size of the logo.

11. An apparatus for providing product information, the apparatus comprising:
    a memory storage device, the memory storage device storing and associating one or more features of a logo with one or more products and corresponding product information in a memory storage device using a product identifier;
    a processor communicatively coupled to the memory storage device, the processor:
    comparing a received image of one or more features of a logo to the stored images of logos to identify the received logo;
    analyzing the received image to determine a presence or absence of distinctive features of the logo;
    identifying a product identifier based on the identification of the one or more features of the received logo;
    retrieving information concerning the one or more products wherein the product information includes product recommendations of one or more complementary products relating to the one or more products, wherein the one or more complementary products include products that are designed to be used in conjunction with the one or more products; and
    transmitting product information corresponding to the product identifier to a user device.

12. The apparatus of claim 11, wherein the processor further identifies a color of the logo.

13. The apparatus of claim 11, wherein the processor further identifies a size of the logo.

14. The apparatus of claim 11, wherein the processor further identifies a background color of the logo.

15. The apparatus of claim 11, wherein the received image of the logo is processed by an image recognition program prior to comparing.

16. The apparatus of claim 11, wherein the processor further identifies a first product based on a first set of features of the logo, and identifies a second product based on a second set of features of the logo.

17. The apparatus of claim 11, wherein the product information includes a price and at least one of a size, material, flavor, color, wash instructions, use instructions, safety information, weight, volume, ingredients, parts list, assembly instructions, disposal instructions, date of manufacture, expiration date, place of manufacture, manufacturer identity, and a hyperlink to a web site related to the product.

\* \* \* \* \*